(12) United States Patent
Meesala et al.

(10) Patent No.: US 12,465,906 B2
(45) Date of Patent: Nov. 11, 2025

(54) CATALYST COMPOSITION FOR THE PRODUCTION OF HYDROGEN

(71) Applicant: HINDUSTAN PETROLEUM CORPORATION LIMITED, Bengaluru (IN)

(72) Inventors: Lavanya Meesala, Bengaluru (IN); Pramod Kumar, Bengaluru (IN)

(73) Assignee: HINDUSTAN PETROLEUM CORPORATION LIMITED, Bengaluru (IN)

( * ) Notice: Subject to any disclaimer, the term of this patent is extended or adjusted under 35 U.S.C. 154(b) by 561 days.

(21) Appl. No.: 17/641,775

(22) PCT Filed: Jun. 3, 2021

(86) PCT No.: PCT/IB2021/054866
§ 371 (c)(1),
(2) Date: Mar. 9, 2022

(87) PCT Pub. No.: WO2022/043773
PCT Pub. Date: Mar. 3, 2022

(65) Prior Publication Data
US 2022/0331784 A1    Oct. 20, 2022

(30) Foreign Application Priority Data
Aug. 26, 2020   (IN) .............................. 202041036816

(51) Int. Cl.
*B01J 23/80* (2006.01)
*B01J 21/18* (2006.01)
(Continued)

(52) U.S. Cl.
CPC .............. *B01J 23/80* (2013.01); *B01J 21/18* (2013.01); *B01J 35/394* (2024.01); *B01J 35/40* (2024.01);
(Continued)

(58) Field of Classification Search
CPC ........ B01J 23/80; B01J 35/635; B01J 35/617; C01B 2203/1058
See application file for complete search history.

(56) References Cited

U.S. PATENT DOCUMENTS

| | | |
|---|---|---|
| 8,430,937 B2 | 4/2013 | Cheiky et al. |
| 2010/0076233 A1 | 3/2010 | Cortright et al. |
| (Continued) | | |

FOREIGN PATENT DOCUMENTS

| | | |
|---|---|---|
| WO | WO-2014188439 A1 | 11/2014 |
| WO | 2018/167467 A1 | 9/2018 |
| (Continued) | | |

OTHER PUBLICATIONS

Nazari, et al. "An investigation of the simultaneous presence of Cu and Zn in different Ni/Al2O3 catalyst loads using Taguchi design of experiment in steam reforming of methane." International Journal of Hydrogen Energy 45.1 (2020): 691-702 (Year: 2020).*
(Continued)

*Primary Examiner* — Anthony J Zimmer
*Assistant Examiner* — Eric Scott Sherman
(74) *Attorney, Agent, or Firm* — Bradley Arant Boult Cummings LLP (57) ABSTRACT

The present disclosure relates to a catalyst composition comprising: (a) nickel; (b) at least one promoter selected from Cu Zn, Mo, Co, Mg, Ce, Ti, Zr, Fe, Pd, Ag, Pt, or combinations thereof; and (c) a support material, wherein, the nickel loading is in the range of 6-19 wt % and the at least one promoter loading is in the range of 0.2-5 wt % with respect to the support material. The present disclosure further discloses a process for preparing a catalyst composition and a process each for the production of hydrogen gas (Continued)

and carbon nanotubes. Also disclosed herein, is use of a catalyst composition for obtaining hydrogen gas and carbon nanotubes.

16 Claims, 7 Drawing Sheets

(51) Int. Cl.
| | |
|---|---|
| *B01J 35/30* | (2024.01) |
| *B01J 35/40* | (2024.01) |
| *B01J 35/45* | (2024.01) |
| *B01J 35/61* | (2024.01) |
| *B01J 35/63* | (2024.01) |
| *B01J 37/02* | (2006.01) |
| *B01J 37/04* | (2006.01) |
| *B01J 37/08* | (2006.01) |
| *C01B 3/26* | (2006.01) |
| *C01B 3/30* | (2006.01) |
| *C01B 32/162* | (2017.01) |

(52) U.S. Cl.
CPC ............ *B01J 35/45* (2024.01); *B01J 35/617* (2024.01); *B01J 35/635* (2024.01); *B01J 37/0207* (2013.01); *B01J 37/0213* (2013.01); *B01J 37/04* (2013.01); *B01J 37/088* (2013.01); *C01B 3/26* (2013.01); *C01B 3/30* (2013.01); *C01B 32/162* (2017.08); *C01B 2203/0277* (2013.01); *C01B 2203/1058* (2013.01); *C01B 2203/1082* (2013.01); *C01B 2203/1241* (2013.01)

(56) References Cited

U.S. PATENT DOCUMENTS

| | | | |
|---|---|---|---|
| 2014/0162873 A1* | 6/2014 | Gu | B01J 35/647 423/460 |
| 2014/0322114 A1 | 10/2014 | Jen et al. | |
| 2014/0328749 A1 | 11/2014 | Hammel et al. | |
| 2016/0129424 A1* | 5/2016 | Pant | C01B 32/162 502/343 |
| 2016/0375426 A1 | 12/2016 | Forrest et al. | |
| 2017/0189891 A1 | 7/2017 | Kumar et al. | |
| 2019/0084832 A1 | 3/2019 | Hu et al. | |

FOREIGN PATENT DOCUMENTS

| | | |
|---|---|---|
| WO | WO-2019055998 A1 | 3/2019 |
| WO | WO-2021033197 A1 | 2/2021 |

OTHER PUBLICATIONS

International Search Report and Written Opinion for PCT/IB2021/054866 mailed Oct. 26, 2021, all pages.

* cited by examiner

CATALYST COMPOSITION FOR THE PRODUCTION OF HYDROGEN

FIELD OF INVENTION

The present disclosure broadly relates to fuel production and particularly refers to catalytic decomposition of methane.

BACKGROUND OF INVENTION

The utilization of fossil fuels for energy production is one of the major contributing factors to excessive greenhouse gas emissions. Combustion of petroleum derivatives such as natural gas, petrol, and diesel emits huge quantities of carbon dioxide into the earth's atmosphere which is leading to alarming anthropogenic climate change, ocean acidification and global warming. The International energy agency's world energy outlook 2012 (World energy outlook. IEA; 2012) expects growth of global energy requirement by more than one-third by the year 2035. On the other hand, the rapid decrease in fossil fuel stocks has placed a huge stress on the scientific community to devise alternative fuels derived from sources other than petroleum in order to limit petroleum dependency for energy production.

Recently, hydrogen has attracted much attention as a green eco-friendly fuel, as it produces only water during its energy generation processes. Hydrogen is the lightest and the most abundantly available element in nature, but unfortunately, it is not present in its purest form and hence, is treated as a secondary fuel. After producing hydrogen from other processes, it can easily be utilized to derive other environmentally friendly hydrogen based fuels, such as hydrogen enriched natural gas.

Also, commonly known as H-CNG, hydrogen enriched natural gas is a mixture of 10-30 v/v % of hydrogen with 70-90 v/v % methane in compressed natural gas (CNG). This combination creates a balance between less flammable methane and highly flammable hydrogen gas. Deviation from 10-30 v/v % hydrogen enrichment causes significant changes in terms of fuel efficiency and emissions are observed. Thus, production of H-CNG requires the blending of hydrogen and CNG in fixed ratios.

Although, CNG is readily available, hydrogen being a secondary fuel has to be produced using a variety of other electrochemical, thermochemical and photochemical technologies. Methane reforming is one such technique that is being widely used for H-CNG production. The process utilizes methane (the main component of natural gas) for the partial production of hydrogen. Partial oxidation of methanol and methane are also well-known techniques for hydrogen production. However, most of the currently used techniques produce inevitable amounts of CO and $CO_2$, which are not only harmful to the environment but also add to the production cost by including costly separation steps.

In view of this, catalyst assisted methane decomposition (CMD) has attracted much attention from the researchers as an alternative route to produce hydrogen without generating any greenhouse gases. CMD has emerged as one of the most promising techniques as no $CO_x$ separation is required from hydrogen and the cost of production of hydrogen is also quite low. However, this technique essentially requires to use highly efficient catalyst materials capable of exhibiting catalytic activity for a longer period of time without getting degraded during the process.

Much of the efforts have been devoted for developing catalyst materials that can overcome the existing drawbacks. U.S. Pat. No. 8,430,937B2 discloses a series of catalysts comprising MFI type zeolite, metal modified MFI type zeolites and heterogenous solid acid catalyst, wherein the metal is selected from Ga, Zn, In, Mo, W, Cr, Pt, Pd, Rh, Rm, Au, Ir. The catalyst is used for the conversion of methane to give combustible fuels.

Despite the tremendous progress the CMD process has achieved in this field, the present state of the art still needs a catalyst material that not only provides efficient conversion of methane into hydrogen but is also economically feasible in terms of long-lasting, cost-effective, and environmentally friendly.

SUMMARY OF THE INVENTION

In a first aspect of the present disclosure, there is provided a catalyst composition comprising: (a) nickel; (b) at least one promoter selected from Cu, Zn, Mo, Co, Mg, Ce, Ti, Zr, Fe, Pd, Ag, Pt or combinations thereof; and (c) a support material, wherein, the nickel loading is in the range of 6-19 wt % and the at least one promoter loading is in the range of 0.2-5 wt % with respect to the support material.

In a second aspect of the present disclosure, there is provided a process for preparing the catalyst composition comprising: (a) nickel; (b) at least one promoter selected from Cu, Zn, Mo, Co, Mg, Ce, Ti, Zr, Fe, Pd, Ag, Pt, or combinations thereof; and (c) a support material, wherein, the nickel loading is in the range of 6-19 wt % and the at least one promoter loading is in the range of 0.2-5 wt % with respect to the support material, the process comprising: (a) contacting a salt of nickel and a salt of the at least one promoter to obtain a mixture; (b) impregnating the mixture on to the support material to obtain an impregnated catalyst material; and (c) calcining the impregnated catalyst material to obtain the catalyst composition.

In a third aspect of the present disclosure, there is provided a process for the production of hydrogen gas from a light hydrocarbon, comprising: (a) adding the catalyst composition comprising: (a) nickel; (b) at least one promoter selected from Cu, Zn, Mo, Co, Mg, Ce, Ti, Zr, Fe, Pd, Ag, Pt, or combinations thereof; and (c) a support material, wherein, the nickel loading is in the range of 6-19 wt % and the at least one promoter loading is in the range of 0.2-5 wt % with respect to the support material in a reactor; (b) passing the light hydrocarbon over a catalyst bed at a temperature in the range of 300-750° C. at atmospheric pressure for 20-50 hours; and (c) obtaining a product stream comprising hydrogen gas.

In a fourth aspect of the present disclosure, there is provided a process for the production of carbon nanotubes from a light hydrocarbon, comprising: (a) adding the catalyst composition comprising: (a) nickel; (b) at least one promoter selected from Cu, Zn, Mo, Co, Mg, Ce, Ti, Zr, Fe, Pd, Ag, Pt, or combinations thereof; and (c) a support material, wherein, the nickel loading is in the range of 6-19 wt % and the at least one promoter loading is in the range of 0.2-5 wt % with respect to the support material in a reactor; (b) passing the light hydrocarbon over a catalyst bed at a temperature in the range of 300-750° C. at atmospheric pressure for 20-50 hours; (c) obtaining a product stream comprising hydrogen gas and a mixture; and (d) processing the mixture to obtain carbon nanotubes.

In a fifth aspect of the present disclosure, there is provided a use of the catalyst composition comprising: (a) nickel; (b) at least one promoter selected from Cu, Zn, Mo, Co, Mg, Ce, Ti, Zr, Fe, Pd, Ag, Pt, or combinations thereof; and (c) a support material, wherein the nickel loading is in the range of 6-19 wt % and the at least one promoter loading is in the range of 0.2-5 wt % with respect to the support material for obtaining hydrogen gas and carbon nanotubes.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF ACCOMPANYING DRAWINGS

The following drawings form a part of the present specification and are included to further illustrate aspects of the present disclosure. The disclosure may be better understood by reference to the drawings in combination with the detailed description of the specific embodiments presented herein.

FIG. 4 (a) depicts the scanning electron microscope (SEM) image of the spent catalyst obtained from run MS105, in accordance with an embodiment of the present disclosure.

FIG. 4 (b) depicts the thermogravimetric analysis (TGA) curve for the spent catalyst obtained from run MS105, in accordance with an embodiment of the present disclosure.

FIG. 5 (a) depicts the TGA curve for the spent catalyst obtained from run MS107, in accordance with an embodiment of the present disclosure.

FIG. 5 (b) depicts the SEM image for the spent catalyst obtained from run MS106, in accordance with an embodiment of the present disclosure.

FIG. 6 (a) depicts the SEM image for the spent catalyst obtained from run MS108, in accordance with an embodiment of the present disclosure.

FIG. 6 (b) depicts the Raman spectrum for the multi-walled carbon nanotubes (MWCNTs) obtained from the run MS108, in accordance with an embodiment of the present disclosure.

FIG. 6 (c) depicts the TGA curve for the spent catalyst obtained from run MS108, in accordance with an embodiment of the present disclosure.

FIG. 6 (d) depicts the energy dispersive X-ray (EDX) results for the spent catalyst obtained from run MS108, in accordance with an embodiment of the present disclosure.

FIG. 7 (a) depicts the SEM image for the spent catalyst obtained from run MS109, in accordance with an embodiment of the present disclosure.

FIG. 7 (b) depicts the Raman spectrum for the MWCNTs obtained from the run MS109, in accordance with an embodiment of the present disclosure.

FIG. 7 (c) depicts the TGA curve for the spent catalyst obtained from run MS109, in accordance with an embodiment of the present disclosure.

FIG. 8 (a) depicts the SEM image for the spent catalyst obtained from run MS114, in accordance with an embodiment of the present disclosure.

FIG. 8 (b) depicts the TGA curve for the spent catalyst obtained from run MS114, in accordance with an embodiment of the present disclosure.

FIG. 8 (c) depicts the Raman spectrum for the MWCNTs obtained from the run MS114, in accordance with an embodiment of the present disclosure.

FIG. 9 (a) depicts catalyst screening for H-CNG fixed bed reactor in terms of $H_2$ vol % in the off-gas for 5% Ni:0.25% Cu:0.25% Zn catalyst, in accordance with an embodiment of the present disclosure.

FIG. 9 (b) depicts the SEM image for 5% Ni:0.25% Cu:0.25% Zn spent catalyst at 60 μm resolution, in accordance with an embodiment of the present disclosure.

FIG. 9 (c) depicts SEM image for 5% Ni:0.25% Cu:0.25% Zn spent catalyst at 100 nm resolution, in accordance with an embodiment of the present disclosure.

DETAILED DESCRIPTION OF THE INVENTION

Those skilled in the art will be aware that the present disclosure is subject to variations and modifications other than those specifically described. It is to be understood that the present disclosure includes all such variations and modifications. The disclosure also includes all such steps, features, compositions, and compounds referred to or indicated in this specification, individually or collectively, and any and all combinations of any or more of such steps or features.

Definitions

For convenience, before further description of the present disclosure, certain terms employed in the specification, and examples are delineated here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

The term "at least one" used herein refers to one or more and thus includes individual components as well as mixtures/combinations.

The term "rpm" used herein refers to rotations/revolutions per minute. It is used to define the speed of any rotating part of the machine.

The term "promoter" refers to a substance that is added to catalysts to improve their performance in a chemical reaction.

The term "carbon nanotube" or "CNT" refers to a layer of carbon atoms bonded by covalent bonds rolled into the form of a cylinder structure. Single-wall carbon nanotubes consist of one single layer of carbon atoms while a multi-walled carbon tube consists of two or more layers of carbon atoms rolled together.

The term "support material" refers to a substance of high surface area and stability used as a support for catalyst, to which the catalyst is affixed. Such support material helps in improving the catalytic activity of a catalyst. Examples include, but are limited to, solid support material such as nickel, silicates, char, and others.

The term "ID/IG ratio" refers to the ratio of intensity of defect (D) band to the graphite (G) band. This ratio helps in estimating the quality of carbon nanotube structures.

The term "off-gas" refers to H-CNG off-gas or methane off-gas suspended from the reactor during the methane conversion reaction. The % vol of $H_2$ in measured in the off-gas for analyzing the performance of the present catalyst composition.

The term "FCC" refers to a process called fluid catalytic cracking that is carried out to regenerate spent catalytic material.

The terms "equilibrium catalyst" or "E-cat" have been used interchangeably throughout the document which refers to the equilibrium catalyst of zeolite material produced from fluid catalytic cracking (FCC) of spent catalytic material. The term "equilibrium catalyst" used herein may also be referred to as "spent FCC equilibrium catalyst".

The elemental symbols Cu, Zn, Mo, Co, Mg, Ce, Ti, Zr, Fe, Pd, Ag and Pt stands for copper, zinc, molybdenum, cobalt, magnesium, cerium, titanium, zirconium, iron, palladium, silver, and platinum, respectively. Accordingly, the elemental symbols with the names have been used interchangeably in the entire specification.

The terms "CNG", "natural gas", and "methane" have been used interchangeably in the entire specification as CNG is a form of natural gas stored under high pressure and methane is the main component of both natural gas and CNG.

The terms "H-CNG", and "hydrogen enriched natural gas" have been used interchangeably in the entire specification as all of them correspond to a blend of 10-30% hydrogen with natural gas.

'WE' refers to Working Example and 'NWE' refers to Non-Working Example, the number accompanying the abbreviations refer to the respective number of Example as per the respective Table in the 'Examples' section.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 6-19% should be interpreted to include not only the explicitly recited limits of about 6% to about 19%, but also to include sub-ranges, such as 7-18%, 9-12%, and so forth, as well as individual amounts, including fractional amounts, within the specified ranges, such as 6.5%, and 6.225%, for example.

As discussed in the background, H-CNG is a better alternative to compressed natural gas as a fuel with respect to low $CO_x$, $NO_x$ emissions, etc. H-CNG is considered to be an interim solution towards $H_2$ based fuel economy. In this direction, the emergence of catalytic methane decomposition has paved a shining way in the field of hydrogen production. Since methane is a very stable molecule with four strong C—H bonds, it is generally decomposed using a catalyst. The process of catalytic methane decomposition comprises of a series of steps involving:
(a) adsorption of methane on the surface of a catalyst
(b) breaking of four C—H bonds and further detachment of methane from the catalyst
(c) adsorption of hydrogen atoms on the surface of the catalyst and consequent formation of $H_2$ molecule The overall reaction can be summarised as below, wherein the carbon (C) represent the various forms of carbonaceous products that may be deposited separately or along with the spent catalyst. To obtain the partial conversion of methane, it is added in excess and the conversion rates are controlled by optimizing the catalyst formulation, reaction temperature, and other process parameters.

$$CH_4(excess) \longrightarrow H_2 + C + \text{unreacted } CH_4$$

In addition to the advantage of using catalyst materials for methane decomposition, the technique is also associated with certain drawbacks related to the performance of the catalyst during the course of the reaction. Issues such as fast deactivation of catalyst, costly regeneration of deactivated catalyst, and purification of carbon by-products obtained during the reaction, hinders in the success of most of the existing catalyst compositions in commercial applications.

As mentioned above, deactivation of the catalyst is a pertinent problem. Due to carbon deposition on the active catalyst surface area/pores, it is generally rendered inactive within a few hours of reaction time and displays poor methane conversion rates. Moreover, regeneration of the spent catalyst and separation of deposited carbonaceous products involves complex steps that increase the overall production cost. On the other hand, the carbonaceous material formed also requires subsequent purification to make it suitable for further applications. The present disclosure addresses the above-mentioned problems by providing a catalyst composition that can overcome the setbacks of the related prior arts by providing hydrogen enriched natural gas as a fuel and MWCNTs with purity greater than 90%.

The present disclosure provides a catalyst composition comprising a low loaded nickel metal, steamed biochar, or equilibrium catalyst as support material and a catalyst promoter. The catalyst composition of the present disclosure, with an added advantage of low loaded nickel metal in the range of 6-19% by weight, also exhibits superior catalytic activity and produces methane off-gas comprising 10-30 vol % of hydrogen (H-CNG). Production of 90-99% pure multi-walled carbon nanotubes (MWCNTs) with ID/IG ratio>1.0, alongside H-CNG, further makes the present catalyst highly economic to use. In addition to the benefits of using environmentally derived biochar as the support material, steaming activation at 800° C. provides a large number of reaction sites with high surface area and pore size. The spent catalyst produced during the reaction, is obtained in a non-agglomerated form comprising char and high purity carbon nanotubes (CNT) which resolves the complexity issue of CNT separation scheme by providing an easy separation using the difference in their thermal stabilities. Owing to the superior mechanical and electrical properties of high purity CNTs, the spent catalyst can also be used directly as a composite material. The present disclosure also discloses a process for simultaneous production of H-CNG and high purity carbon nanotubes which is substantially free of $CO_x$, $NO_x$ greenhouse gas emissions. The process can be run for a prolonged period of 20-50 hours and generate H-CNG in a continuous mode. Thus, the catalyst composition of the present disclosure is economically beneficial alternative to substitute conventional catalyst materials used in catalytic methane decomposition reaction for hydrogen-based fuel production.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference.

The present disclosure is not to be limited in scope by the specific embodiments described herein, which are intended for the purposes of exemplification only. Functionally-equivalent products, compositions, and methods are clearly within the scope of the disclosure, as described herein.

In an embodiment of the present disclosure, there is provided a catalyst composition comprising: (a) nickel; (b) at least one promoter selected from Cu, Zn, Mo, Co, Mg, Ce, Ti, Zr, Fe, Pd, Ag, Pt, or combinations thereof; and (c) a support material, wherein the nickel loading is in the range of 6-19 wt % and the at least one promoter loading is in the range of 0.2-5 wt % with respect to the support material. In an embodiment of the present disclosure, there is provided a catalyst composition as described herein, wherein the nickel loading is in the range of 8-15 wt % with respect to the support material and the at least one promoter loading is in the range of 0.3-3 wt % with respect to the support material. In another embodiment of the present disclosure, the nickel loading is in the range of 9-11 wt % and the at least one promoter loading is in the range of 0.5-1 wt % with respect to the support material.

In an embodiment of the present disclosure, there is provided a catalyst composition comprising: (a) nickel; (b) at least one promoter is a combination of Cu and Zn; and (c) a support material, wherein the nickel loading is in the range of 6-19 wt % and the at least one promoter loading is in the range of 0.2-5 wt % with respect to the support material.

In an embodiment of the present disclosure, there is provided a catalyst composition comprising: (a) nickel; (b) at least one promoter is a combination of Cu and Zn; and (c) a support material, wherein the nickel loading is in the range of 6-19 wt % and the at least one promoter loading is in the range of 0.2-5 wt % with respect to the support material, wherein the Cu loading is in the range of 0.3-4 wt % and Zn loading is in the range of 0.3-4 wt % with respect to the support material. In another embodiment of the present disclosure, the Cu loading is in the range of 0.4-3 wt % and Zn loading is in the range of 0.4-3 wt % with respect to the support material. In another embodiment of the present disclosure, the Cu loading is in the range of 0.5-2 wt % and Zn loading is in the range of 0.5-2 wt % with respect to the support material.

In an embodiment of the present disclosure, there is provided a catalyst composition comprising: (a) nickel; (b) at least one promoter selected from Cu, Zn, Mo, Co, Mg, Ce, Ti, Zr, Fe, Pd, Ag, Pt, or combinations thereof; and (c) a support material, wherein the nickel loading is in the range of 6-19 wt % and the at least one promoter loading is in the range of 0.2-5 wt % with respect to the support material and the support material is steamed biochar or equilibrium catalyst. In an embodiment of the present disclosure, there is provided a catalyst composition comprising: (a) nickel; (b) at least one promoter selected from Cu, Zn, Mo, Co, Mg, Ce, Ti, Zr, Fe, Pd, Ag, Pt, or combinations thereof; and (c) steamed biochar as a support material having a surface area in the range of 700-950 $m^2$/g and a pore volume in the range of 0.60-0.70 cc/g, wherein the nickel loading is in the range of 6-19 wt % and the at least one promoter loading is in the range of 0.2-5 wt % with respect to the support material.

In an embodiment of the present disclosure, there is provided a catalyst composition comprising: (a) nickel; (b) at least one promoter selected from Cu, Zn, Mo, Co, Mg, Ce, Ti, Zr, Fe, Pd, Ag, Pt, or combinations thereof; and (c) steamed biochar as a support material obtained from heating a raw support material selected from the group consisting of raw biochar sawdust, raw biochar rice straw, raw biochar rice husk, raw biochar bagasse, other agricultural wastes, and combinations thereof, wherein the nickel loading is in the range of 6-19 wt % and the at least one promoter loading is in the range of 0.2-5 wt % with respect to the support material.

In an embodiment of the present disclosure, there is provided a catalyst composition comprising: (a) nickel; (b) at least one promoter selected from Cu, Zn, Mo, Co, Mg, Ce, Ti, Zr, Fe, Pd, Ag, Pt, or combinations thereof; and (c) steamed biochar as a support material obtained from heating a raw support material selected from the group consisting of raw biochar sawdust, raw biochar rice straw, raw biochar rice husk, raw biochar bagasse, other agricultural wastes, and combinations thereof at a temperature in the range of 700 to 900° C. for a time period in the range of 5-10 hours, wherein the nickel loading is in the range of 6-19 wt % and the at least one promoter loading is in the range of 0.2-5 wt % with respect to the support material. In another embodiment of the present disclosure steamed biochar as a support material obtained from heating a raw support material at a temperature in the range of 750 to 850° C. for a time period in the range of 7-9 hours.

In an embodiment of the present disclosure, there is provided a catalyst composition comprising: (a) nickel; (b) at least one promoter selected from Cu, Zn, Mo, Co, Mg, Ce, Ti, Zr, Fe, Pd, Ag, Pt, or combinations thereof; and (c) seamed biochar as a support material having a surface area in the range of 700-950 $m^2$/g and a pore volume in the range of 0.60-0.70 cc/g obtained from heating a raw support material selected from the group consisting of raw biochar sawdust, raw biochar rice straw, raw biochar rice husk, raw biochar bagasse, wherein the nickel loading is in the range of 6-19 wt % and the at least one promoter loading is in the range of 0.2-5 wt % with respect to the support material.

In an embodiment of the present disclosure, there is provided a catalyst composition comprising: (a) nickel; (b) at least one promoter is a combination of Cu and Zn; and (c) steamed biochar as a support material having a surface area in the range of 700-950 $m^2$/g and a pore volume in the range of 0.60-0.70 cc/g, wherein the nickel loading is in the range of 6-19 wt % and the at least one promoter loading is in the range of 0.2-5 wt % with respect to the support material.

In an embodiment of the present disclosure, there is provided a catalyst composition comprising: (a) nickel; (b) at least one promoter is a combination of Cu and Zn; and (c) steamed biochar as a support material having a surface area in the range of 700-950 $m^2$/g and a pore volume in the range of 0.60-0.70 cc/g, wherein the nickel loading is in the range of 6-19 wt % and the at least one promoter loading is in the range of 0.2-5 wt % with respect to the support material, and wherein the Cu loading is in the range of 0.4-4 wt % and Zn loading is in the range of 0.4-4 wt % with respect to the support material.

In an embodiment of the present disclosure, there is provided a catalyst composition comprising: (a) nickel; (b) at least one promoter is a combination of Cu and Zn; and (c) steamed biochar as a support material having a surface area in the range of 700-950 m$^2$/g and a pore volume in the range of 0.60-0.70 cc/g obtained from heating a raw support material selected from the group consisting of raw biochar sawdust, raw biochar rice straw, raw biochar rice husk, raw biochar bagasse, other agricultural wastes, and combinations thereof, wherein the nickel loading is in the range of 6-19 wt % and the at least one promoter loading is in the range of 0.2-5 wt % with respect to the support material.

In an embodiment of the present disclosure, there is provided a catalyst composition comprising: (a) nickel; (b) at least one promoter is a combination of Cu and Zn, wherein the Cu loading is in the range of 0.4-4 wt % and Zn loading is in the range of 0.4-4 wt % with respect to the support material; and (c) steamed biochar as a support material having a surface area in the range of 700-950 m$^2$/g and a pore volume in the range of 0.60-0.70 cc/g obtained from heating a raw support material selected from the group consisting of raw biochar sawdust, raw biochar rice straw, raw biochar rice husk, raw biochar bagasse, other agricultural wastes, and combinations thereof, wherein the nickel loading is in the range of 6-19 wt %.

In an embodiment of the present disclosure, there is provided a process for preparing the catalyst composition as described herein, the process comprising: (a) contacting a salt of nickel and a salt of the at least one promoter to obtain a mixture; (b) impregnating the mixture on to the support material to obtain an impregnated catalyst material; and (c) calcining the impregnated catalyst material to obtain the catalyst composition.

In an embodiment of the present disclosure, there is provided a process for preparing the catalyst composition, the process as described herein, wherein the at least one promoter is selected from Cu, Zn, Mo, Co, Mg, Ce, Ti, Zr, Fe, Pd, Ag, Pt, or combinations thereof.

In an embodiment of the present disclosure, there is provided a process for preparing the catalyst composition as described herein, the process comprising: (a) contacting a salt of nickel and a salt of the at least one promoter at a temperature in the range of 30-35° C. for a time period in the range of 40-120 minutes to obtain a mixture; (b) impregnating the mixture on to the support material at a temperature in the range of 30-35° C. for a time period in the range of 40-120 minutes to obtain an impregnated catalyst material; and (c) calcining the impregnated catalyst material in an inert atmosphere at a temperature in the range of 530-570° C. for a time period in the range of 250-350 minutes to obtain the catalyst composition.

In an embodiment of the present disclosure, there is provided a process for preparing the catalyst composition as described herein, the process comprising: (a) contacting a salt of nickel and a salt of the at least one promoter to obtain a mixture; (b) impregnating the mixture on to the support material to obtain an impregnated catalyst material; and (c) calcining the impregnated catalyst material to obtain the catalyst composition, wherein the support material is steamed biochar obtained by steaming of raw support material selected from the group consisting of raw biochar sawdust, raw biochar rice straw, raw biochar rice husk, raw biochar bagasse, other agricultural wastes, and combinations thereof at a temperature in the range of 700 to 900° C. for a time period in the range of 5-10 hours.

In an embodiment of the present disclosure, there is provided a process for preparing the catalyst composition as described herein, the process comprising: (a) contacting a salt of nickel and a salt of the at least one promoter to obtain a mixture; (b) impregnating the mixture on to the support material to obtain an impregnated catalyst; (c) drying the impregnated catalyst material to obtain a dried catalyst; and (d) calcining the dried catalyst to obtain the catalyst composition.

In an embodiment of the present disclosure, there is provided a process for preparing the catalyst composition as described herein, the process comprising: (a) contacting a salt of nickel and a salt of the at least one promoter at a temperature in the range of 30-35° C. for a time period in the range of 40-120 minutes to obtain a mixture; (b) impregnating the mixture on to the support material at a temperature in the range of 30-35° C. for a time period in the range of 40-120 minutes to obtain an impregnated catalyst material; (c) drying the impregnated catalyst material at a temperature in the range of 90-120° C. for a time period in the range of 47-50 hours to obtain a dried catalyst; and (d) calcining the dried catalyst in an inert atmosphere at a temperature in the range of 530-570° C. for a time period in the range of 250-350 minutes to obtain the catalyst composition.

In an embodiment of the present disclosure, there is provided a process for preparing the catalyst composition as described herein, wherein the salt of nickel is selected from the group nickel nitrate, nickel sulfate, nickel phosphate, nickel carbonate, nickel bicarbonate, nickel halide, nickel hydroxide, nickel sulfide, nickel carbide, nickel nitride, nickel oxide, nickel carboxylate, or mixtures thereof.

In an embodiment of the present disclosure, there is provided a process for preparing the catalyst composition as described herein, wherein a salt of the at least one promoter is selected from the group of nitrates, sulfates, phosphates, carbonates, bicarbonates, halides, hydroxides, sulfides, carbides, nitrides, oxides, carboxylates, or mixtures thereof, and wherein the at least one promoter is selected from Cu, Zn, Mo, Co, Mg, Ce, Ti, Zr, Fe, Pd, Ag, Pt, or combinations thereof.

In an embodiment of the present disclosure, there is provided a process for preparing the catalyst composition as described herein, wherein the salt of at least one promoter is selected from the group of nitrates, sulfates, phosphates, carbonates, bicarbonates, halides, hydroxides, sulfides, carbides, nitrides, oxides, carboxylates, or mixtures thereof, and wherein the at least one promoter is selected from Cu, Zn, or combinations thereof. In another embodiment of the present disclosure, the salt of at least one promoter is nitrate and the at least one promoter is a combination of Cu and Zn.

In an embodiment of the present disclosure, there is provided a process for the production of hydrogen gas from a light hydrocarbon, comprising: (a) adding the catalyst composition as described herein in a reactor; (b) passing the light hydrocarbon over a catalyst bed at a temperature in the range of 300-750° C. at atmospheric pressure for 20-50 hours; and (c) obtaining a product stream comprising hydrogen gas, wherein the catalyst composition comprises steamed biochar or equilibrium catalyst as a support material. In another embodiment of the present disclosure, passing the light hydrocarbon over a catalyst bed is done at a temperature in the range of 400-700° C. at atmospheric pressure for 20-50 hours. In yet another embodiment of the present disclosure, passing the light hydrocarbon over a catalyst bed is done at a temperature in the range of 500-600° C. at atmospheric pressure for 20-50 hours. In another embodiment of the present disclosure, the passing the light hydrocarbon over a catalyst bed is carried out at a temperature in the range of 400-600° C. at atmospheric pressure for 21-46 hours.

In an embodiment of the present disclosure, there is provided a process for the production of hydrogen gas from a light hydrocarbon as described herein, wherein the product stream is substantially free of carbon monoxide and carbon dioxide.

In an embodiment of the present disclosure, there is provided a process for the production of hydrogen gas from a light hydrocarbon as described herein, wherein the product stream is free of carbon monoxide and carbon dioxide.

In an embodiment of the present disclosure, there is provided a process for the production of hydrogen gas from a light hydrocarbon, comprising: (a) adding the catalyst composition as described herein in a reactor; (b) passing the light hydrocarbon over a catalyst bed at a temperature in the range of 300-750° C. at atmospheric pressure for 20-50 hours; and (c) obtaining a product stream comprising hydrogen gas, wherein the process produces 10-30% of hydrogen gas of the total content of the light hydrocarbon.

In an embodiment of the present disclosure, there is provided a process for the production of hydrogen gas from a light hydrocarbon, comprising: (a) adding the catalyst composition as described herein in a reactor; (b) passing the light hydrocarbon over a catalyst bed at a temperature in the range of 300-750° C. at atmospheric pressure for 20-50 hours; and (c) obtaining a product stream comprising hydrogen gas, wherein the product stream is processed to obtain carbon nanotubes and the catalyst composition comprises steamed biochar or equilibrium catalyst as a support material.

In an embodiment of the present disclosure, there is provided a process for the production of hydrogen gas from a light hydrocarbon, comprising: (a) adding the catalyst composition as described herein in a reactor; (b) passing the light hydrocarbon over a catalyst bed at a temperature in the range of 300-750° C. at atmospheric pressure for 20-50 hours; and (c) obtaining a product stream comprising hydrogen gas, wherein the process produces 10-30% of hydrogen gas of the total content of the light hydrocarbon, and wherein the product stream is processed to obtain carbon nanotubes.

In an embodiment of the present disclosure, there is provided a process for the production of hydrogen gas from a light hydrocarbon, obtaining a product stream comprising hydrogen gas, wherein the product stream is processed to obtain multi-walled carbon nanotubes having ID/IG ratio of 0.5-2.5.

In an embodiment of the present disclosure, there is provided a process for the production of carbon nanotubes from a light hydrocarbon, comprising: (a) adding the catalyst composition as described herein in a reactor; (b) passing the light hydrocarbon over a catalyst bed at a temperature in the range of 300-750° C. at atmospheric pressure for 20-50 hours; (c) obtaining a product stream comprising hydrogen gas and a mixture; and (d) processing the mixture to obtain carbon nanotubes. In another embodiment of the present disclosure, passing the light hydrocarbon over a catalyst bed is done at a temperature in the range of 400-700° C. at atmospheric pressure for 21-48 hours. In yet another embodiment of the present disclosure, passing the light hydrocarbon over a catalyst bed is done at a temperature in the range of 500-600° C. at atmospheric pressure for 22-46 hours.

In an embodiment of the present disclosure, there is provided a process for the production of carbon nanotubes from a light hydrocarbon as described herein, wherein the product stream is substantially free of carbon monoxide and carbon dioxide.

In an embodiment of the present disclosure, there is provided a process for the production of hydrogen gas from a light hydrocarbon as described herein, wherein the light hydrocarbon is not particularly limited to an aliphatic hydrocarbon, but also includes one or more hydrocarbons selected from aromatic hydrocarbons and alicyclic hydrocarbons, provided that the hydrocarbons can be decomposed to produce hydrogen. The aliphatic hydrocarbons may have 1 to 20 carbon atoms, more preferably 1 to 12 carbon atoms including examples, but not limited to, decane, nonane, heptane, pentane, isopentane, or petroleum fractions such as naphtha and liquified petroleum gas (LPG). The aromatic hydrocarbons may have 5 to 16 carbon atoms, including examples, but not limited to, benzene, tetraline, ethylbenzene, xylene, or toluene. The alicyclic hydrocarbons may have 3 to 12 carbon atoms, including examples, but not limited to, cyclopentane, cyclobutene, cyclopropane, cycloheptane, or ethyl cyclopentane.

In an embodiment of the present disclosure, there is provided a process for the production of carbon nanotubes from a light hydrocarbon as described herein, wherein the carbon nanotubes have purity in the range of 90-99%.

In an embodiment of the present disclosure, there is provided a process for simultaneous production of carbon nanotubes and hydrogen gas from a light hydrocarbon as described herein, wherein the light hydrocarbon is selected from methane, ethane, propane, butane, ethylene, acetylene, or combinations thereof.

In an embodiment of the present disclosure, there is provided a process for simultaneous production of carbon nanotubes and hydrogen gas from a light hydrocarbon as described herein, wherein the product stream is free of carbon monoxide and carbon dioxide.

In an embodiment of the present disclosure, there is provided a process for simultaneous production of carbon nanotubes and hydrogen gas from a light hydrocarbon as described herein, wherein the product stream is substantially free of carbon monoxide and carbon dioxide.

In an embodiment of the present disclosure, there is provided a process for the production of carbon nanotubes from a light hydrocarbon as described herein, wherein the light hydrocarbon is selected from methane, ethane, propane, butane, ethylene, acetylene, or combinations thereof.

In an embodiment of the present disclosure, there is provided a process for the production of hydrogen gas from a light hydrocarbon as described herein, wherein the light hydrocarbon is selected from methane, ethane, propane, butane, ethylene, acetylene, or combinations thereof.

In an embodiment of the present disclosure, there is provided a process for the production of carbon nanotubes from a light hydrocarbon as described herein, wherein the reactor is selected from fluidized bed reactor, moving bed reactor, fixed bed reactor, or rotating bed reactor. In another embodiment of the present disclosure, the reactor is fluidized bed reactor.

In an embodiment of the present disclosure, there is provided a process for the production of hydrogen gas from a light hydrocarbon as described herein, wherein the reactor is selected from fluidized bed reactor, moving bed reactor, fixed bed reactor, or rotating bed reactor. In another embodiment of the present disclosure, the reactor is fluidized bed reactor.

In an embodiment of the present disclosure, there is provided a process for the production of carbon nanotubes from a light hydrocarbon, comprising: (a) adding the catalyst composition as described herein in a reactor; (b) passing the light hydrocarbon over a catalyst bed at a temperature in the range of 300-750° C. at atmospheric pressure for 20-50 hours; (c) obtaining a product stream comprising hydrogen gas and a mixture; and (d) processing the mixture to obtain carbon nanotubes carried out by a process selected from acidic treatment, washing, drying, or combinations thereof.

In an embodiment of the present disclosure, there is provided a process for the production of carbon nanotubes from a light hydrocarbon, comprising: (a) adding the catalyst composition as described herein in a reactor; (b) passing the light hydrocarbon over a catalyst bed at a temperature in the range of 300-750° C. at atmospheric pressure for 20-50 hours; (c) obtaining a product stream comprising hydrogen gas and a mixture; and (d) processing the mixture to obtain carbon nanotubes, wherein the carbon nanotubes are multi-walled carbon nanotubes having ID/IG ratio of 0.5-2.5. In another embodiment of the present disclosure, the carbon nanotubes are multi-walled carbon nanotubes having ID/IG ratio of 0.7-2.5. In yet another embodiment of the present disclosure, the carbon nanotubes are multi-walled carbon nanotubes having ID/IG ratio of 1.0-2.5.

In an embodiment of the present disclosure, there is provided a use of the catalyst composition as described herein for obtaining hydrogen gas and carbon nanotubes.

In an embodiment of the present disclosure, slight modifications in the catalyst composition can be carried out to obtain various forms of carbonaceous products that may be deposited separately or along with the spent catalyst, wherein carbonaceous product may be in the form of SWCNT, MWCNT, carbon nano onions, carbon nano rings, graphitic carbon, amorphous carbon, or combinations thereof.

Although the subject matter has been described in considerable detail with reference to certain examples and implementations thereof, other implementations are possible.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may apply.

The working and non-working examples as depicted in the forthcoming sections highlight the criticality of the working percentages of different components i.e., nickel, promoter and support material in achieving the catalyst composition of the present disclosure. It is further specified that the presence of all the components is critical so as to achieve the desired catalytic activity. The absence of any of the components specified above or replacement of the same with any other component substantially affects the catalytic activity, desired $H_2$% in the off-gas and purity of carbon nanotubes produced therefrom.

Materials and Methods

Biochar was obtained from fast pyrolysis of saw dust in a pilot plant reactor. FCC equilibrium catalyst (E-cat) was procured commercially. The instruments for scanning-electron microscope (SEM) and energy dispersive X-ray (EDX) analysis were procured from Jeol, Korea. Instrument for TGA was procured from TA instruments, USA. Raman analyzer was procured from Rinissaw, UK. The fixed bed reactor was designed by HPCL research and development department.

Example 1

Catalyst Preparation and Performance

A series of experiments were conducted to evaluate the effect of various variables including metal loading percentage, support material and catalyst flow rate on the overall performance of the catalyst in terms of % volume of $H_2$ obtained in the off-gas and the purity of carbon nanotubes produced simultaneously. For this purpose, various catalysts were synthesized as formulated in Table 1 and subjected to a fluidized-bed reactor system for the production of hydrogen by methane (natural gas) conversion.

Example 1.1: Preparation of the Catalyst Composition

A nickel metal-based catalyst was prepared using wet impregnation method. $Ni(NO_3)_2 \cdot 6H_2O$, $Cu(NO_3)_2 \cdot 3H_2O$, and $Zn(NO_3)_2 \cdot 6H_2O$ were used as metal precursor salts to draw nickel, copper and zinc into the solution. A measured amount of each $Cu(NO_3)_2 \cdot 3H_2O$ and $Zn(NO_3)_2 \cdot 6H_2O$ (calculated according to the final wt % of metal required in final catalyst) were mixed in demineralized water. Required quantity of $Ni(NO_3)_2 \cdot 6H_2O$ was added in distilled water in a 500 mL conical flask and heated at about 30° C. for 1 hour with continuous stirring to obtain a mixture. On the other hand, activated biochar was prepared by steaming biochar at 800° C. temperature for 8 hours. This resulted in steamed biochar having BET surface area of 860 $m^2$/g with high pore volume of 0.66 cc/g, whereas the biochar before steaming had negligible surface area and porosity. After that, measured amount of steamed biochar was added in the same conical flask for catalyst impregnation and the obtained solution was stirred for 1 hour at about 30° C. temperature. The mixed solution was then transferred into a 1000 mL round bottom flask and again stirred at 70-80 rpm in a rota-vapour in order to remove water from the product. Further to this, the impregnated catalyst material was oven dried at 110° C. for 48 h, followed by calcination at 550° C. in inert atmosphere for 5 h to obtain the final catalyst which was further crushed and sieved to get fluidizable particle in the range of 45 to 150 micron.

Example 1.2: Process for Production of Hydrogen Enriched Natural Gas

In the first step, a catalyst was loaded into the hopper from where 15 g of it was transferred to fluidized bed reactor. As a pre-requisite to the reaction procedure, the reactor was heated to 550° C. and flushed with $N_2$ gas at 15 SLPH (standard litres per hour). The loaded catalyst was then reduced/activated under hydrogen enriched natural gas/pure hydrogen atmosphere at 550-580° C. for 3-5 h. Followed by this, flow-controlled piped natural gas (feed gas) was passed through the catalyst bed in FBR and the reaction was allowed to occur for more than 20 h at 550° C. The hydrogen gas produced from a catalytic reaction on natural gas, yielded hydrogen enriched natural gas (H-CNG) as the product stream and a spent catalyst comprising char and carbon nanotubes. Another by-product of the reaction was MWCNTs, which being heavier got deposited at the bottom of the reactor. The H-CNG product stream was passed through cyclone/hot filter and collected for further applications while the heat recovered from the hot filter was utilized in activating the catalyst. Once the reaction was complete in FBR, the spent catalyst was emptied using either vacuum or high velocity to cyclone it to the spent catalyst unloading vessel. This spent catalyst was also analysed using TGA, SEM, and Raman analysis. At different time intervals, product gas sample was collected and analysed in GC equipped with flame ionization detector (FID) and thermal conductivity detector (TCD). Differential pressure transmitter (DPT) reading was monitored continuously to stop the reaction as the CNT deposition on catalyst lead to high pressure drop. This further lead to choke in the gas distributor. Hence, even though catalyst might be active in some cases, reaction was terminated due to high-pressure drop. In commercial scale reactors, this can be avoided using ring sparger kind of gas distributors in place of lab scale sintered or wire mesh distributors.

Example 1.3: Catalyst Formulation

Figure 1:
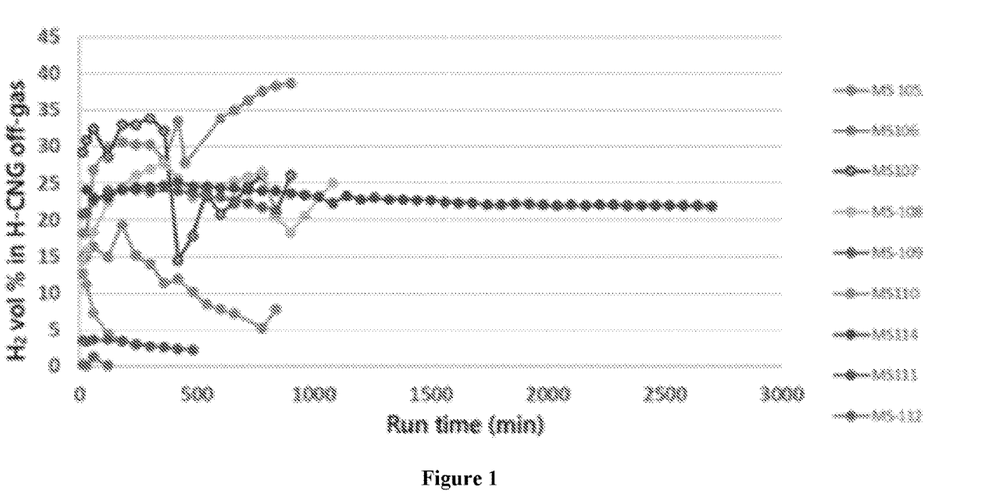
FIG. 1 depicts the catalyst screening for H-CNG in terms of $H_2$ vol % in the off-gas measured against the run time in minutes for runs MS105, MS106, MS107, MS108, MS109, MS110, MS111, MS112, and MS114, in accordance with an embodiment of the present disclosure.

A set of catalysts with varying nickel loading and support material were formulated. For MS-105 and MS-106 runs, while the reduction temperature was varied between 550-580° C., the reaction was conducted at 550° C. for 5 h. For MS107 to MS114, the reduction was conducted at 580° C. for 6 h and the reaction was carried out at 550° C. The vol % of $H_2$ in the H-CNG off-gas was continuously recorded against the run time (hours). The weight of spent catalyst collected and the % purity of carbon in the carbon nanotubes deposited on it was also measured. Table 1 shows the maximum and minimum of vol % $H_2$ obtained in the off-gas with formulated catalysts having varied weight percentage of nickel, copper and zinc. Steamed biochar (SBC) with alumina ($Al_2O_3$), activated carbon (AC), and E-cat were used as the catalyst support material and compared. While most of the catalysts were loaded at 2 L/g/h gas hourly space velocity (GHSV), MS106 was loaded at 1.66 L/g/h GHSV. Fresh alumina catalyst density was 888 kg/m³ and the spent catalyst density was 389.8 kg/m³. Fresh SBC catalyst density was 250-350 kg/m³ and the spent catalyst density was 150-250 kg/m³. As the reaction progressed, due to decrease in the density of the particles, they become more cohesive and led to defluidization of the bed. Experiments with MS105-108 were stopped after few hours of methane feeding. To restart the experiment, hydrogen flush was done for 1 h as the reactor was cooling under $N_2$ over night. Hence, there is a fluctuation in FIG. 1 in $H_2$ vol % in the off-gas. From MS109 onwards to MS114, experiments were conducted in 24X7 operation of unit. Hence, could achieve stable conversion.

TABLE 1

| Run Code | % Ni | % Cu | % Zn | Catalyst support material | Catalyst loading amount (g) | Run time (h) | $H_2$ Vol % (Max-Min) | Spent catalyst Collected (g) | TGA (% C on spent catalyst) |
|---|---|---|---|---|---|---|---|---|---|
| MS024 | 0 | 0 | 0 | SBC | 30 | 3 | 40.0-29.0 | — | 80 |
| MS105 | 20 | 1.6 | 1.6 | SBC | 12.5 | 15 | 18.1-38.7 | 20.51 | 82.5 |
| MS106 | 10 | 0.5 | 0.5 | $Al_2O_3$ | 15 | 18 | 14.99-7.8 | 25.55 | 75 |
| MS107 | 20 | 1.6 | 1.6 | $Al_2O_3$ | 15 | 15 | 29.1-26.1 | 49.95 | 70 |
| MS108 | 10 | 0.5 | 0.5 | SBC | 15 | 18 | 18.4-26.9 | 49 | 96 |
| MS109 | 10 | 0.5 | 0.5 | SBC | 15 | 14 | 20.7-23.9 | 38 | 95 |
| MS110 | 0 | 0 | 0 | AC | 15 | 5 | 12.7-2.5 | 11.8 | 98 |
| MS111 | 10 | 0.5 | 0.5 | AC | 15 | 8 | 3.57-2.28 | 11.65 | 82.5 |
| MS112 | — | — | — | E-cat | 15 | 2 | 0.088-1.25 | 14.8 | — |
| MS114 | 10 | 0.5 | 0.5 | E-cat | 15 | 45 | 23.9-21.8 | >120 g | 93 |

Figure 2:
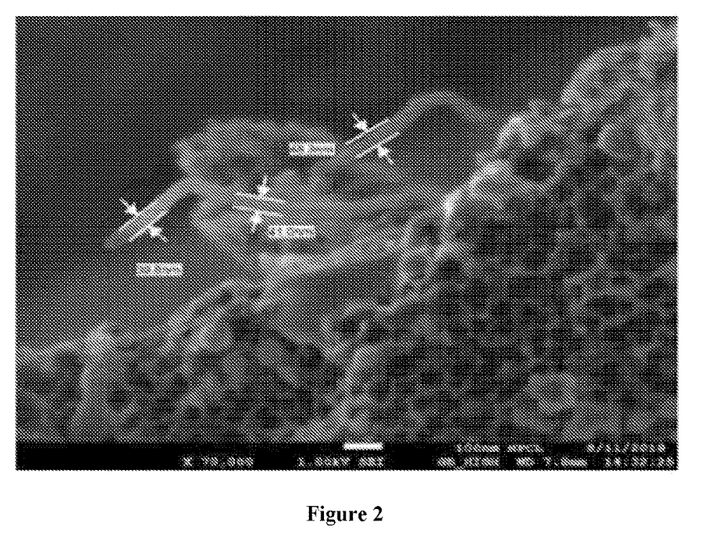
FIG. 2 depicts the scanning electron microscope (SEM) image of the spent catalyst obtained from run MS024, in accordance with an embodiment of the present disclosure.
Figure 3:
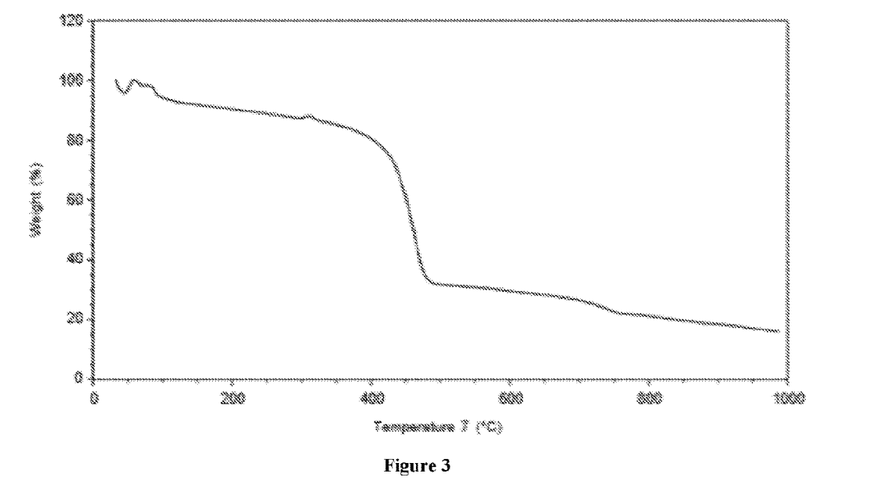
FIG. 3 depicts the thermogravimetric analysis (TGA) curve for the spent catalyst obtained from run MS024, in accordance with an embodiment of the present disclosure.

The run MS024 was a control experiment with only SBC without any metal impregnation. The reaction was performed in a fixed bed reactor for 3 hours. Natural gas was piped at 10 SLPH and the reaction temperature for hydrogen production was set at 750° C. The obtained spent SBC from the control experiment was subjected to SEM. FIG. 2 showed majorly carbon from the SBC support having a porous structure with very few carbon nanotubes (diameter range 40-100 nm) formation. Further, the TGA data projected in FIG. 3, influenced by the carbon from SBC, showed low temperature decomposition at less than 450° C. whereas TGA images for other runs showed highly thermally stable CNTs up to 550° C. Moreover, the run produced >30 $H_2$ vol % and also generated >5% CO and $CO_2$ green house gases which was completely undesirable. Thus, the obtained results substantiated the failure of using only SBC for H-CNG production.

MS110 was a control experiment without any metal impregnation on commercial grade activated carbon (AC) support which initially showed 12 vol % of $H_2$ in the off-gas, however, is reduced to 2.5 vol % $H_2$ in the later 5 hours. Due to absence of metal, such as aluminium in $Al_2O_3$, the AC support remained 98% pure. However, the amount of spent catalyst collected was very less as compared to other catalyst loaded in the same amount of 15 g.

Figure 5:
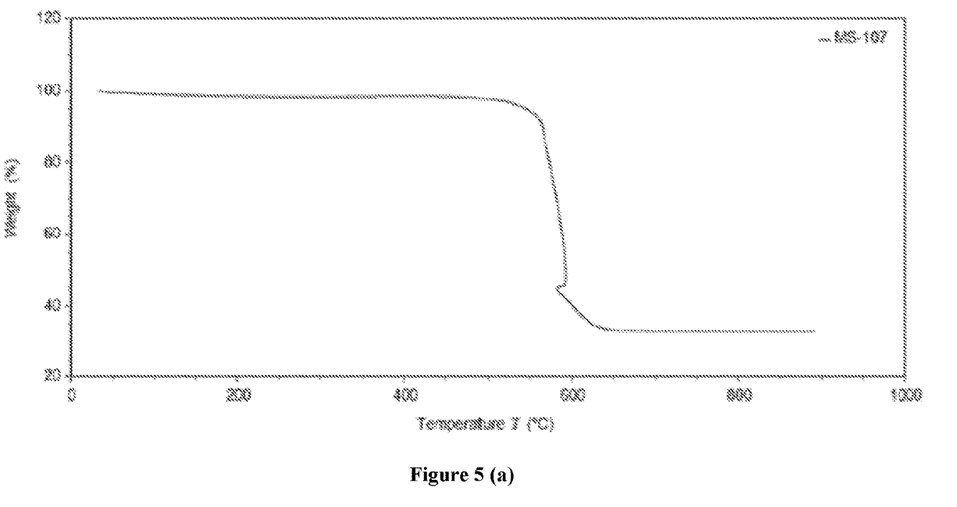

The run MS107 (20% Ni, 1.6% Cu, 1.6% Zn, NWE) was conducted for 15 hours on $Al_2O_3$ support. Although, this run gave 10-30 $H_2$ vol % in the off-gas, the reaction could not be continue after 15 hours due to agglomeration of the spent catalyst. Moreover, the $Al_2O_3$ support rendered the spent catalyst with only 70% carbon purity as depicted in the TGA curve in FIG. 5 (*a*).

The run MS106 (10% Ni, 0.5% Cu, 0.5% Zn, NWE) conducted for 18 hours on $Al_2O_3$ support although led to higher spent catalyst collection than MS105, it gave <10 $H_2$ vol % in the off-gas. The SEM image of the collected spent catalyst with 94.1 nm diameter are shown in FIG. 5 (*b*). The CNTs showed a purity of 75% in the spent catalyst. Since, Al₂O₃ as the catalyst support did not show desirable results, further runs with SBC and AC as support materials were carried out.

Figure 4:
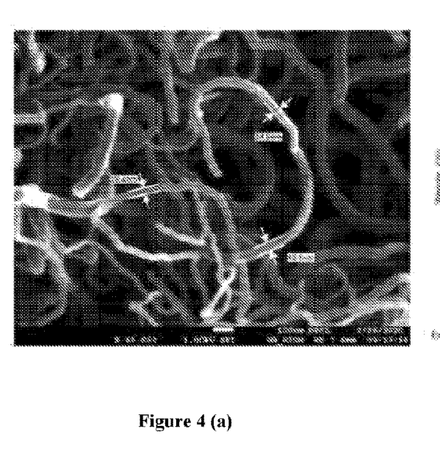

MS105 (20% Ni, 1.6% Cu, 1.6% Zn, NWE) run on SBC showed >30 $H_2$ vol % in the off-gas. The run was conducted for 15 hours. 20.51 g of spent catalyst was collected that was comparatively less than the other catalyst formulations. The SEM image in FIG. 4 (a) shows carbon nanotubes formation in the diameter range of 30-70 nm. TGA analysis (FIG. 4 (b)) for obtained CNTs depict a purity of 85% which is substantially less than the desired range. Since, both the catalyst, MS107 and MS105 with 20% Ni loading irrespective of the catalyst support material, gave negative results with respect to $H_2$ vol %, further performance of the catalyst was tested with a lower nickel percentage loading.

Figure 6:
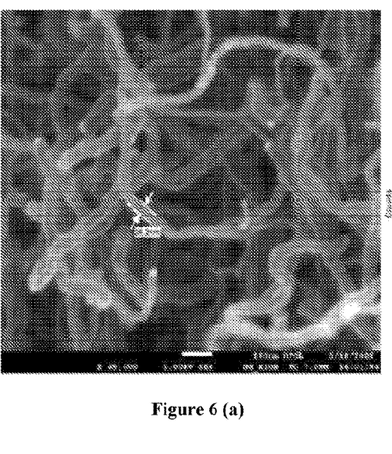

The run MS108 (10% Ni, 0.5% Cu, 0.5% Zn, WE) conducted on SBC support for 18 hours could meet hydrogen volume percent requirement in 10-30 vol % i.e., recorded range of 18.4-26.9%. An appreciable amount of 49 g of spent catalyst was recovered from the reaction. FIG. 6 (a) illustrates the SEM images of the spent catalyst showing complete carbon nanotubes formation having diameter 28.2 nm. Further, the purity of CNTs and MWCNTs was also investigated using TGA and Raman spectroscopy, respectively. The CNTs displayed 96% purity in the TGA results as depicted in FIG. 6 (c). Raman studies in FIG. 6 (a) for the MWCNTs showed an ID/IG ratio of greater than 2.0 i.e., 2.14. The EDX results shown in FIG. 6 (d) further confirmed the formation of catalyst in appropriate stoichiometry.

Figure 7:
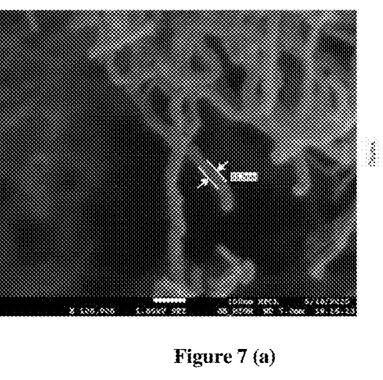

Run with MS109 (10% Ni, 0.5% Cu, 0.5% Zn, WE) which was conducted for 14 hours on continuous basis, only showed a slight decrease in spent catalyst collected. However, the $H_2$ vol % was within the desired range of 10-30 vol % and the TGA showed 95% CNTs purity (FIG. 7 (c)). The decrease in the run time from 18 hours in MS108 to 14 hours in MS109 marks a decrease in the ID/IG ratio of the MWCNTs from 2.14 to 2.04 respectively, as depicted in the Raman spectrum in FIG. 7 (b). FIG. 7 (a) further illustrates complete carbon nanotube formation with having diameter near 33 nm.

The run MS111 (10% Ni, 0.5% Cu, 0.5% Zn, NEW) was carried out to inspect the performance of 10% Ni loading on support material other than SBC. Hence, activated carbon was used here for 8 hours impregnated with 10% nickel catalyst. Surprisingly, the run showed very less $H_2$ vol % in the off-gas i.e., in the range of 2 to 3.5%. With even 15 g of catalyst loading, the spent catalyst recovered was very less (11 g) and the CNTs obtained were also only 82.5% pure. Thus, activated carbon was disregarded as a suitable support material for the catalyst composition of the present disclosure. Except MS110 and MS111, rest of the spent catalyst shows presence of 30 to 100 nm carbon nanotubes.

Further explorations with 10% nickel loaded catalyst formulation were done using FCC equilibrium catalyst (E-cat) as the catalyst support material. E cat is one of the cost effective and abundantly available discarded support material. Run MS112 (NWE) was conducted as a control experiment with E-cat without any metal impregnation which showed almost nil conversion of methane with even 15 g catalyst loading.

Figure 8:
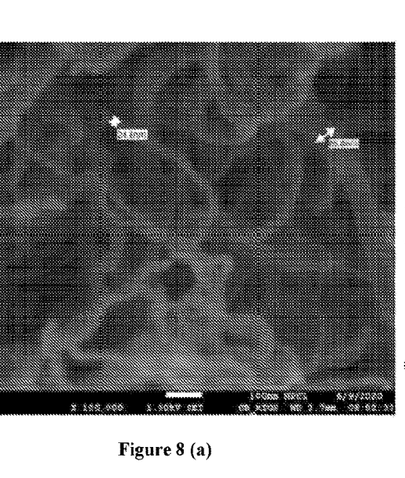

The run MS114 (10% Ni, 0.5% Cu, 0.5% Zn, supported on E-cat, WE) was carried out continuously for 45 hours. It was able to produce stable hydrogen volume percent in the off-gas (23.9 to 21.8 vol %) for the entire run duration without causing any defluidization or catalyst agglomeration. The spent catalyst was recovered in substantial amount (>100 g) and the CNTs produced were also 93% pure as shown by TGA curve in FIG. 8 (b). FIG. 8 (a) shows the SEM image of the spent catalyst with carbon nanotubes formation and FIG. 8 (c) illustrates the Raman spectrum showing ID/IG ratio of 1.83 for the MWCNTs obtained.

Overall, it was concluded from the above experimental analysis that the catalyst formulation with 10% nickel, 0.5% Cu and 0.5% Zn loaded on SBC catalyst support material proved to be most effective in producing H-CNG with $H_2$ enrichment in the desired percentage range of 10-30% for a prolonged period of 45 hours. The SEM image of the spent catalyst collected for this catalyst formulation showed complete carbon nanotube formation with an excellent purity above 95%. Further, the MWCNTs obtained during the reaction highlighted lesser structural defects by showing ID/IG ratio of >2.0 that can successfully be utilized in a variety of optical, electronics, construction, and biomedical fields. Moreover, the present catalyst composition showed no substantial production of carbon dioxide and carbon dioxide greenhouse gases during the entire course of the reaction.

Example 2

Effect of lower Nickel Loading

Figure 9:
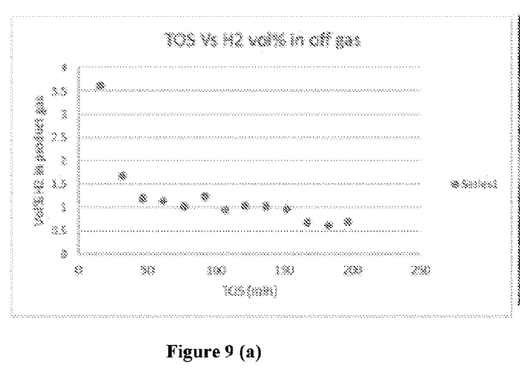

To study the effect of lower nickel loading in the catalyst composition, a catalyst formulation comprising 5% nickel, 0.25% copper, and 0.25% zinc (5:0.25:0.25) supported SBC was formulated. The catalyst was reduced at 550° C. for 5 hours and feeded in a fixed-bed reactor system. Methane gas (CNG) was used as the feed gas to carry out the conversion. The data for $H_2$ vol % in the off-gas is illustrated in FIG. 9 (a) which shows no more than 3.7 vol % of $H_2$ which is undesirably low and unfeasible for such energy consuming reaction systems. Moreover, the SEM image of the spent catalyst revealed in both FIG. 9 (b) at 60 µm resolution and FIG. 9 (c) at a higher 100 nm resolution showed only slight carbon nanotube nucleation with no clear carbon nanotube formation. Thus, it can be inferred from the above analysis that nickel loading at lower percentage of 5% fails to provide desirable results for hydrogen production and also renders the spent catalyst unusable for further carbon nanotube recovery.

Advantages of the Present Disclosure

The above-mentioned implementation examples as described on this subject matter and its equivalent thereof have many advantages, including those which are described.

The present disclosure discloses a catalyst composition comprising low loaded nickel metal in the range of 6-19 wt % supported on steam activated biochar material. The catalyst displays excellent results for hydrogen production and provides 10-30% $H_2$ enriched natural gas. Hence, a H-CNG fuel produced therefrom, can be successfully utilized in various industries employing high energy processes. The present disclosure uses steam activated biochar as the catalyst support material which is readily available in the environment and is biodegradable. This helps to avoid the use of other heavy metal supports and significantly decrease generation of chemical waste. Further, the present catalyst demonstrates a commendable workability at lower temperature of 550° C. and exhibits a prolonged run time of 20-50 hours. This aids in an efficient H-CNG production with high energy conservation. The formed spent catalyst comprising char and carbon nanotubes can be used directly as composite material, adsorbents and in other premium applications without separation. Moreover, the carbon nanotubes produced demonstrate high purity of above 90%. On the other hand, the MWCNTs also have minimized structural defects and behave as ideal candidates for application in steel, cement, and electronic industries.

Although the subject matter has been described in considerable detail with reference to certain embodiments thereof, other embodiments are possible. As such, the spirit and scope of the disclosure should not be limited to the description of the embodiments contained herein.

We claim:

1. A catalyst composition for production of a methane off-gas and a carbon nanotube by a conversion of methane, wherein the methane off-gas includes 10-30 vol % of hydrogen and the carbon nanotube has purity in the range of 90-99%, said composition comprising:
   nickel;
   promoter comprising of Cu and Zn; and
   a support material selected from steamed biochar and spent FCC equilibrium catalyst;
   wherein the nickel loading is in the range of 6-10 wt % and the promoter loading is in the range of 0.2-5 wt % with respect to the support material;
   wherein the steamed biochar has a surface area of 860 m$^2$/g.

2. The composition of claim 1, wherein the at least one promoter loading is in the range of 1-5 wt % with respect to the support material.

3. The composition of claim 1, wherein the Cu loading is in the range of 0.5-4 wt % and Zn loading is in the range of 0.5-4 wt % with respect to the support material.

4. The composition of claim 1, wherein the steamed biochar has a pore volume in the range of 0.60-0.70 cc/g.

5. The catalyst composition of claim 1, wherein the steamed biochar is obtained from heating a raw support material selected from the group consisting of raw biochar sawdust, raw biochar rice straw, raw biochar rice husk, raw biochar bagasse, other agricultural wastes, and combinations thereof.

6. A process for preparing the catalyst composition of claim 1, the process comprising:
   (a) contacting a salt of nickel and a salt of the promoter, a combination of Cu and Zn to obtain a mixture;
   (b) impregnating the mixture on to the support material to obtain an impregnated catalyst material; and
   (c) calcining the impregnated catalyst material to obtain the catalyst composition.

7. The process of claim 6, wherein the support material is steamed biochar obtained by steaming of raw support material selected from the group consisting of raw biochar sawdust, raw biochar rice straw, raw biochar rice husk, raw biochar bagasse, other agricultural wastes, and combinations thereof at a temperature in the range of 700 to 900° C. for a time period in the range of 5-10 hours.

8. A process for the production of hydrogen gas from light hydrocarbon, comprising:
   (a) adding the catalyst composition of claim 1 in a reactor;
   (b) passing the light hydrocarbon over a catalyst bed at a temperature in the range of 300-750° C. at atmospheric pressure for 20-50 hours; and
   (c) obtaining a product stream comprising hydrogen gas.

9. The process of claim 8, wherein the product stream is free of carbon monoxide and carbon dioxide.

10. The process of claim 8, wherein the process produces 10-30% of hydrogen gas of the total content of the light hydrocarbon.

11. The process of claim 8, wherein the product stream is processed to obtain carbon nanotubes.

12. A process for the production of carbon nanotubes from a light hydrocarbon, comprising:
   (a) adding the catalyst composition of claim 1 in a reactor;
   (b) passing the light hydrocarbon over a catalyst bed at a temperature in the range of 300-750° C. at atmospheric pressure for 20-50 hours; and
   (c) obtaining a product stream comprising hydrogen gas and a mixture;
   (d) processing the mixture to obtain carbon nanotubes.

13. The process of claim 12, wherein the product stream is free of carbon monoxide and carbon dioxide.

14. The process of claim 12, wherein the carbon nanotubes have purity in the range of 90-99%.

15. The process of claim 8, wherein the light hydrocarbon is selected from methane, ethane, propane, butane, ethylene, acetylene, or combinations thereof.

16. The process of claim 8, wherein the reactor is selected from fluidized bed reactor, moving bed reactor, fixed bed reactor, or rotating bed reactor.

* * * * *